US012466989B2

(12) United States Patent
Misra et al.

(10) Patent No.: US 12,466,989 B2
(45) Date of Patent: Nov. 11, 2025

(54) MICROEMULSIONS AND USES THEREOF

(71) Applicant: PETROLIAM NASIONAL BERHAD (PETRONAS), Kuala Lumpur (MY)

(72) Inventors: Sanjay Misra, Kuala Lumpur (MY); Jamal Mohamed Ibrahim, Kuala Lumpur (MY); Intan Khalida Saleh, Kuala Lumpur (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 0 days.

(21) Appl. No.: 17/275,797

(22) PCT Filed: Sep. 10, 2019

(86) PCT No.: PCT/MY2019/050053
§ 371 (c)(1),
(2) Date: Mar. 12, 2021

(87) PCT Pub. No.: WO2020/055229
PCT Pub. Date: Mar. 19, 2020

(65) Prior Publication Data
US 2021/0348048 A1  Nov. 11, 2021

(30) Foreign Application Priority Data

Sep. 14, 2018  (MY) .............................. PI2018001571

(51) Int. Cl.
*C09K 8/536* (2006.01)
*C09K 8/524* (2006.01)
(Continued)

(52) U.S. Cl.
CPC .............. *C09K 8/536* (2013.01); *C09K 8/524* (2013.01); *C09K 8/528* (2013.01); *C09K 8/602* (2013.01);
(Continued)

(58) Field of Classification Search
CPC ......... C09K 8/536; C09K 8/524; C09K 8/528
See application file for complete search history.

(56) References Cited

U.S. PATENT DOCUMENTS 7,073,588 B2 *  7/2006  Cassidy ................. C23F 11/04
166/371
10,717,919 B2 *  7/2020  Germack ................. C09K 8/26
(Continued)

FOREIGN PATENT DOCUMENTS

CN         107761123 A        3/2018
WO   WO-2006078723 A2 *  7/2006  ............... C09K 8/36
(Continued)

OTHER PUBLICATIONS

International Search Report from corresponding PCT Application No. PCT/MY2019/050053 dated Dec. 27, 2019.
(Continued)

*Primary Examiner* — Mark Eashoo
*Assistant Examiner* — M. Reza Asdjodi
(74) *Attorney, Agent, or Firm* — Harness Dickey & Pierce P.L.C.

(57) ABSTRACT

The present invention generally relates to microemulsions comprising a compound of Formula (I), a solvent, a surfactant and optionally a co-surfactant disclosed herein, wherein the ratio of the surfactant to the co-surfactant is about 100:0 to about 20:90. The disclosed microemulsions may be useful in preventing or removing organic deposits, inorganic deposits, metal naphthenates, napthenic acids, and/or mixtures thereof from subterranean formations. The disclosed microemulsions may also be useful in stimulating tight carbonate reservoirs.

7 Claims, 5 Drawing Sheets

(51) Int. Cl.
  *C09K 8/528* (2006.01)
  *C09K 8/60* (2006.01)
  *C09K 8/92* (2006.01)
  *C11D 3/33* (2006.01)
  *E21B 37/06* (2006.01)

(52) U.S. Cl.
  CPC .............. *C09K 8/92* (2013.01); *C11D 3/33* (2013.01); *E21B 37/06* (2013.01)

(56) References Cited

U.S. PATENT DOCUMENTS

| | | | |
|---|---|---|---|
| 2008/0161210 A1* | 7/2008 | Welton | C09K 8/805 |
| | | | 507/218 |
| 2009/0118380 A1* | 5/2009 | Del Gaudio | C09K 8/54 |
| | | | 514/772 |
| 2010/0314117 A1* | 12/2010 | Li | C09K 8/524 |
| | | | 166/307 |
| 2013/0133886 A1* | 5/2013 | Quintero | C09K 8/52 |
| | | | 166/279 |
| 2014/0262289 A1* | 9/2014 | Reyes | C09K 8/74 |
| | | | 507/241 |
| 2014/0284053 A1* | 9/2014 | Germack | C09K 8/26 |
| | | | 166/279 |
| 2014/0296113 A1* | 10/2014 | Reyes | C09K 8/74 |
| | | | 510/109 |
| 2015/0087563 A1* | 3/2015 | Brege | C09K 8/524 |
| | | | 507/103 |
| 2015/0329676 A1* | 11/2015 | Miyake | C08G 73/1042 |
| | | | 521/185 |
| 2016/0102239 A1* | 4/2016 | Pietrangeli | E21B 37/00 |
| | | | 166/312 |
| 2018/0037792 A1* | 2/2018 | Champagne | C09K 8/035 |
| 2018/0148631 A1* | 5/2018 | Casalini | C09K 8/524 |
| 2020/0056088 A1* | 2/2020 | Veldman | C09K 8/03 |
| 2020/0190396 A1* | 6/2020 | Reyes | C09K 8/86 |
| 2020/0239762 A1* | 7/2020 | Bittner | C09K 8/86 |
| 2020/0332177 A1* | 10/2020 | Hill | C09K 8/92 |
| 2021/0348048 A1* | 11/2021 | Misra | E21B 37/06 |

FOREIGN PATENT DOCUMENTS

| | | | | |
|---|---|---|---|---|
| WO | WO-2007091058 A1 * | 8/2007 | | C09K 8/68 |
| WO | 2014150499 A1 | 9/2014 | | |
| WO | 2014160643 A1 | 10/2014 | | |
| WO | 2016061104 A1 | 4/2016 | | |
| WO | WO-2016156584 A1 * | 10/2016 | | C09K 8/524 |

OTHER PUBLICATIONS

Written Opinion from corresponding PCT Application No. PCT/MY2019/050053 dated Dec. 27, 2019.

* cited by examiner

[Fig. 1]
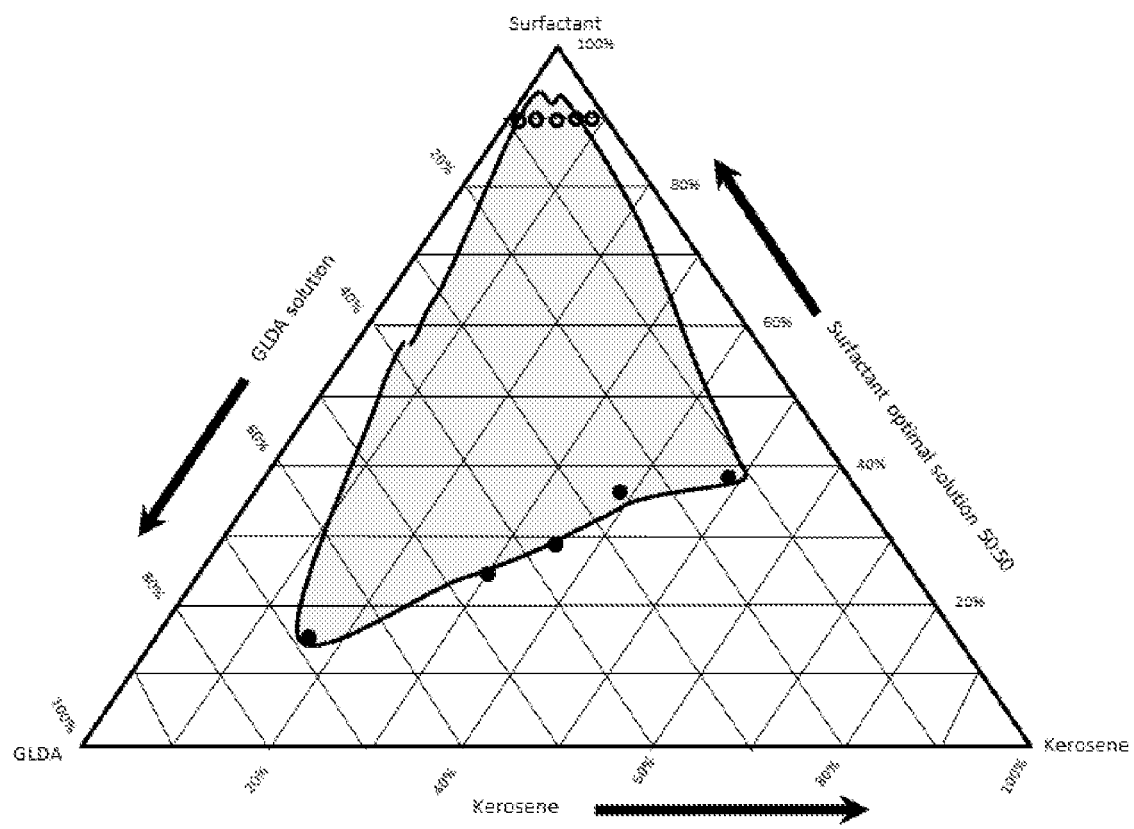

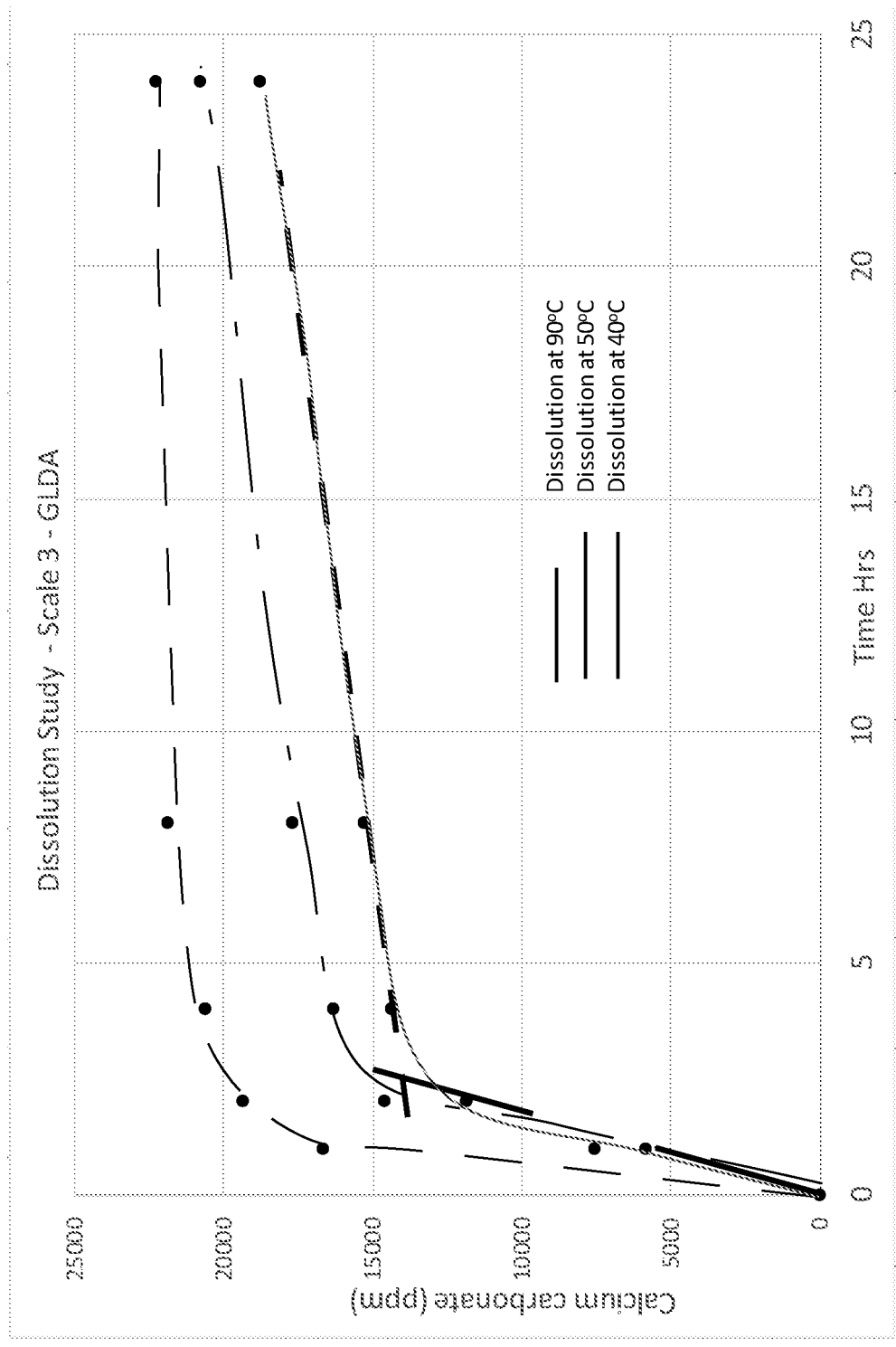
[Fig. 2]

[Fig. 3]
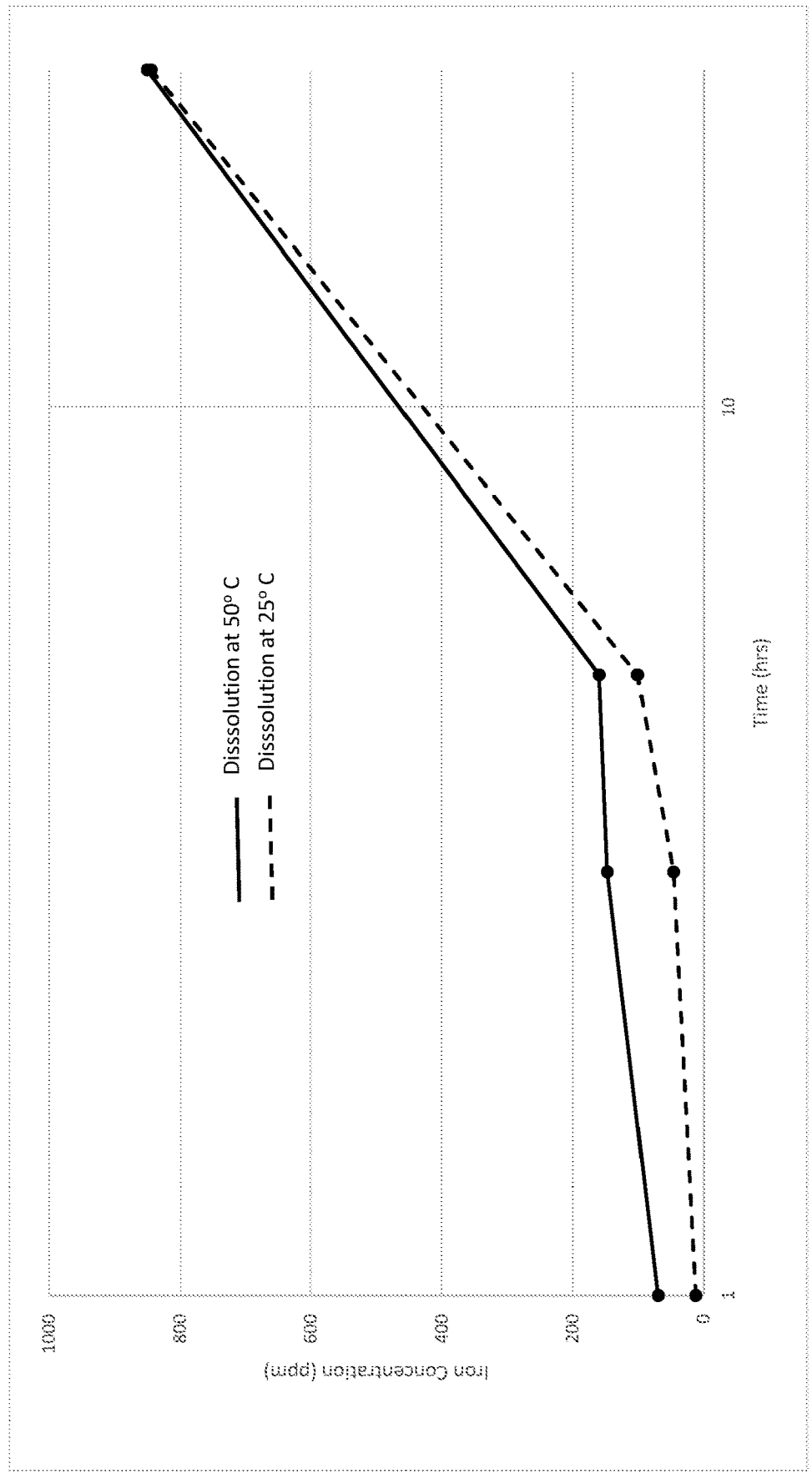

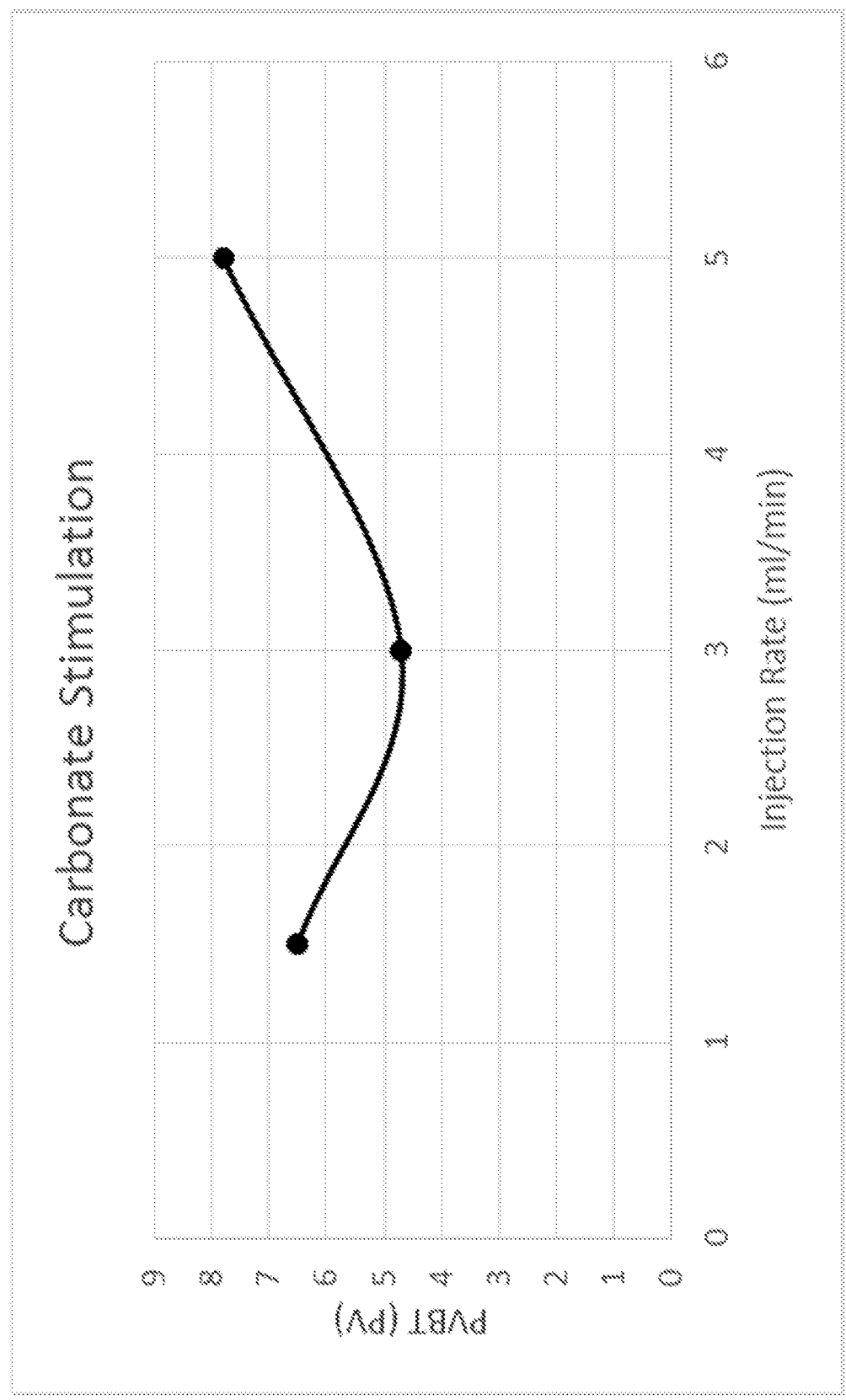
[Fig. 4]

[Fig. 5]
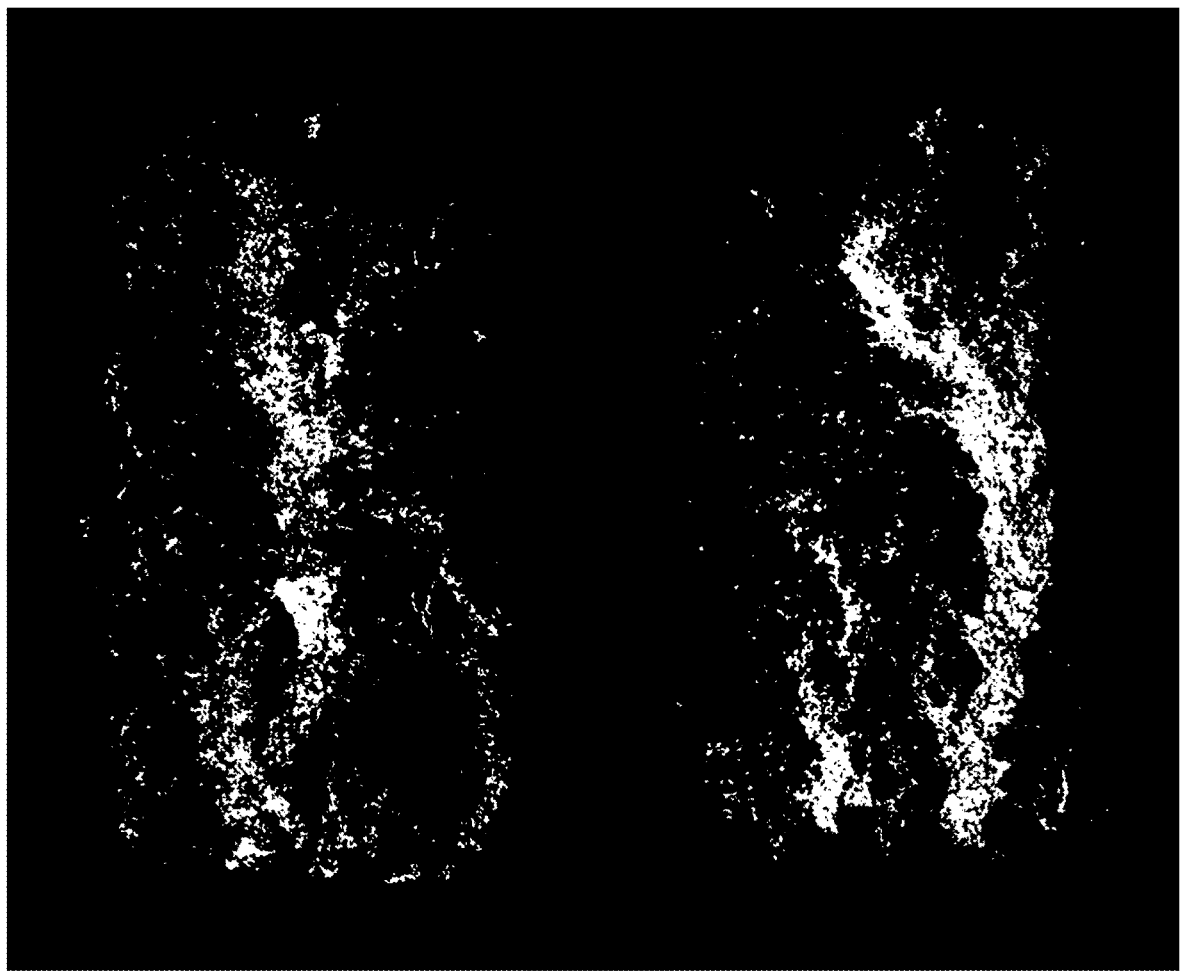

MICROEMULSIONS AND USES THEREOF

PRIORITY STATEMENT

This application is a national stage application under 35 U.S.C. § 371 of PCT International Application No. PCT/MY2019/050053, which has an international filing date of 10 Sep. 2019 and claims priority under 35 U.S.C. § 119 to Malaysian Patent Application No. PI 2018001571 filed on 14 Sep. 2018. The contents of each application recited above are incorporated herein by reference in their entirety.

TECHNICAL FIELD

The present invention generally relates to microemulsions useful for preventing or removing formation of organic deposits, inorganic deposits, and/or mixtures thereof from subterranean formations. The present invention also relates to uses thereof.

BACKGROUND ART

In the oilfield industry, operations involving crude oil extraction from subterranean formations often face several challenges such as removal of mixed scales and metal naphthenates in wellbores, and methods for stimulation of wetted rock surfaces in subterranean formations.

Two main classifications of scales are known; inorganic and organic scales. Both types are mutually exclusive and may occur simultaneously in the same system, referred to as mixed scales. Mixed scales are also referred to as wetted scales. Mixed scales may result in highly complex structured scales that are difficult to treat and may require aggressive, severe and sometimes costly techniques to remove.

Conventional solutions such as aqueous or organic based formulations have been used in attempts to dissolve these scales. However, as both inorganic and organic species are present in mixed scales, attempts to dissolve these scales in either aqueous or organic based formulations are challenging, for example, organic matter may remain deeply embedded within inorganic (e.g. Calcite) matrixes which prevent its dissolution in aqueous acidic solvents. Conversely, mixed scales could also be predominantly organic matter containing calcite precipitates within an organic matrix. Such scales, when treated with organic based chemicals, produce a sludge which chokes pipeline which may cause reduced flow rates and frequent unplanned shutdown maintenance.

Metal naphthenate or naphthenic acid deposits are another challenge in the oilfield industry. Although the term "naphthenic acids" was originally used to describe acids that contain naphthenic rings, today this term is used in a more general sense and refers to all cyclic, acyclic, and aromatic acids in crude oil. Naphthenates are generally organic carboxylate salts that form through interaction of naphthenic acids in crude oil with metal ions in a high pH environment. Metal naphthenate deposits are generally formed when crude oil is extracted from the reservoir. The depressurization during the extraction process causes carbon dioxide to flash into the gas phase, causing an increase in pH of the liquid. Consequently, the naphthenic acid reacts with the metal ions to form metal naphthenate salts. Metal naphthenates are largely left untreated in oilfield operations due to their amphoteric nature and often foul pipelines and wellbores, causing reduced flow rates and frequent unplanned shutdown maintenance.

Deposition of mixed scales and metal naphthenates during oilfield operations also causes damage to the subterranean formations. The permeability of the formation is reduced and the flow resistance increases. Consequently, the rate of crude oil extraction is reduced and causes economic loss. Conventional methods to stimulate the formation by using either aqueous or organic based formulations has not produced positive results. Generally, to stimulate subterranean carbonate rock reservoirs, acid treatment methods such as acid injection with hydrochloric acid and acetic acid have been used. While the acids react quickly with carbonates at higher downhole temperatures, these acids also caused corrosion in pipelines and form acid-oil sludge. Furthermore, the fast reaction rates of the acids with carbonate rock formations are unsuitable for stimulating tight carbonate reservoirs. Tight carbonate reservoirs contains carbonate rock formations with low permeability. To stimulate tight carbonate reservoirs, an acidizing mechanism called wormholing is generally employed where when the acid comes into contact with the carbonate rock, a reaction occurs and the acid dissolves the carbonates on the surface of the carbonate rock. As the acid propagates or permeates through the porous media, the acid-carbonate dissolution reaction may also occur at the pore surfaces. Thus, two phenomena known as etching (face dissolution) and leaching (dissolution of pore channels) may occur simultaneously. Etching is limited by the acid-carbonate reaction rate whereas leaching is limited by the injection rate of the acid. As more channels are formed by etching and leaching, more acid will permeate into the porous media. Consequently, a dominant high permeability channel is formed where the acid flow overruns the moving acid front by many folds. This channel breaks through the core, thereby forming a wormhole. In summary, if the reaction rate is fast, the chemical should be injected at a high injection rate to achieve optimum wormholing. However, for tight reservoirs and long horizontal wells where large areas of the rock was exposed to acidizing treatment, it was impossible to achieve desirable injection rates for highly reactive chemicals such as 15% hydrochloric acid and 13% acetic acid. Hence, achieving optimum wormholing is challenging as a balance between the injection rate and the reaction rate is needed.

There is therefore a need to provide a composition useful for preventing or removing formation of organic deposits, inorganic deposits, mixed scales, metal naphthenates, naphthenic acids and/or mixtures thereof from subterranean formations. There is also a need to provide a method for stimulating carbonate reservoirs.

SUMMARY

According to a first aspect, there is provided a microemulsion comprising a compound of Formula (I), a solvent, a surfactant and optionally a co-surfactant, wherein the ratio of the surfactant to the co-surfactant is about 100:0 to about 10:90:

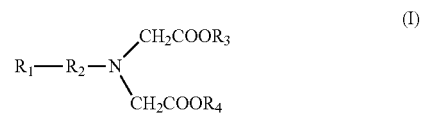

wherein:
$R_1$ is H, OH, or COORS;
$R_2$ is branched or unbranched alkylene, alkenylene, or alkynylene, each of which may be optionally substituted with one or more substituents; and $R_3$, $R_4$, and $R_5$ are independently selected from H, an alkali metal ion, or an optionally substituted ammonium group.

Advantageously, the microemulsions may be thermodynamically stable emulsions where the droplets of the dispersed phase continuously coalesce and reform. As the nano-sized droplets remain in constant Brownian motion, the droplets contact solid surfaces of scales randomly and may result in a chemical reaction. More advantageously, the nano-sized droplets may collide with each other exchanging its contents with one another (for example, by percolation), which helps distribution of the reaction products within the microemulsion body and may assist in propagation of the reaction. Thus, there is provided a microemulsion which is a stable mixture of two immiscible phases, where both the phases can react with mixed scale deposits and/or metal naphthenates/naphthenic acids in a wellbore.

Further advantageously, the microemulsion of the present disclosure may possess properties that are capable of dissolving both the inorganic and organic species in mixed scales and metal naphthenates/naphthenic acids. More advantageously, the microemulsion may be efficient in removing deposits in subterranean formations damaged by mixed scale deposits, thereby improving flow assurance in oilfield operations. Further advantageously, the microemulsions of the present disclosure may be good inhibitors of metal naphthenates. They may prevent deposition of metal naphthenates as well as control emulsion problems emanating from the formation of metal naphthenates.

According to a second aspect, there is provided a method for preventing or removing formation of organic deposits, inorganic deposits, metal naphthenates, naphthenate acids and/or mixtures thereof from subterranean formations comprising the steps of:

(i) providing a microemulsion comprising a compound of Formula (I), a solvent, a surfactant and optionally a co-surfactant, wherein the ratio of the surfactant to the co-surfactant is about 100:0 to 10:90:

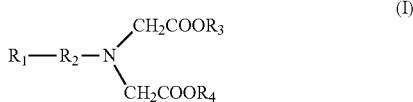

(I)

wherein:

$R_1$ is H, OH, or COORS;

$R_2$ is an optionally substituted branched or unbranched alkylene, alkenylene, or alkynylene;

$R_3$, $R_4$, and $R_5$ are independently selected from H, an alkali metal ion, or an optionally substituted ammonium group, and (ii) introducing the microemulsion into a subterranean formation.

According to a third aspect, there is provided a method for stimulating a carbonate reservoir in a subterranean formation, comprising injecting a microemulsion into the subterranean formation, wherein the microemulsion comprises a compound of Formula (I), a solvent, a surfactant and optionally a co-surfactant, wherein the ratio of the surfactant to the co-surfactant is about 100:0 to 10:90:

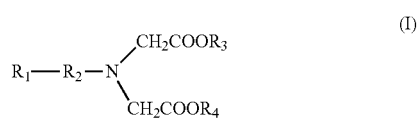

(I)

wherein:

$R_1$ is H, OH, or COORS;

$R_2$ is an optionally substituted branched or unbranched alkylene, alkenylene, or alkynylene;

$R_3$, $R_4$, and $R_5$ are independently selected from H, an alkali metal ion, an optionally substituted amino, or an optionally substituted ammonium group.

Advantageously, the low reactivity of the microemulsion may enable deep penetration of tight carbonate rocks at low injection rates. This may provide for optimum wormholing, reduced corrosion and raw material costs.

Definitions

The following words and terms used herein shall have the meaning indicated:

As used herein, the term "microemulsion" refers to a thermodynamically stable and transparent or substantially transparent emulsion of aqueous and organic phases. While normal emulsions can be unstable and revert into an immiscible non-homogenous state, microemulsions remain homogenous and transparent over a long period of time. Microemulsions may be water-in-oil (W/O) or oil-in-water (O/W) types.

The term "stable microemulsion" as used herein refers to optical clarity/transparency of the microemulsion formulation, i.e. no distinction to solvent in physical appearance of the microemulsion by visual inspection, and droplet size of less than about 200 nm. No change in physical appearance by visual inspection implies to optical clarity/transparency i.e. non-existence of haziness, cloudiness, opaqueness, sedimentation, precipitation, crystallization and phase separation, etc., for a period of at least 4 weeks The term "cloud point" as used herein refers to the phase separation of the microemulsion formulation into one surfactant-rich and one surfactant-poor phase. The microemulsion has not reached cloud point if there is no change in physical appearance by visual inspection with regard to optical clarity/transparency i.e. non-existence of haziness, cloudiness, opaqueness, sedimentation, precipitation, crystallization, etc.

As used herein, the term "alkyl" includes within its meaning monovalent ("alkyl") and divalent ("alkylene") straight chain or branched chain saturated aliphatic groups having from 1 to 20 carbon atoms, eg, 1, 2, 3, 4, 5, 6, 7, 8, 9, 10, 11, 12, 13, 14, 15, 16, 17, 18, 19, or 20 carbon atoms. For example, the term alkyl includes, but is not limited to, methyl, ethyl, 1-propyl, isopropyl, 1-butyl, 2-butyl, isobutyl, tert-butyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, octyl, nonyl, decyl, undecyl, dodecyl, tridecyl, tetradecyl, pentadecyl, hexadecyl, heptadecyl, octadecyl, nonadecyl, eicodecyl and the like. Alkyl groups may be optionally substituted, i.e. unsubstituted or substituted.

As used herein, the term "alkenyl" refers to divalent straight chain or branched chain unsaturated aliphatic groups containing at least one carbon-carbon double bond and having from 2 to 20 carbon atoms, eg, 2, 3, 4, 5, 6, 7, 8, 9, 10, 11, 12, 13, 14, 15, 16, 17, 18, 19, or 20 carbon atoms. For example, the term alkenyl includes, but is not limited to, ethenyl, propenyl, butenyl, 1-butenyl, 2-butenyl, 2-methylpropenyl, 1-pentenyl, 2-pentenyl, 2-methylbut-1-enyl, 3-methylbut-1-enyl, 2-methylbut-2-enyl, 1-hexenyl, 2-hexenyl, 3-hexenyl, 2,2-dimethyl-2-butenyl, 2-methyl-2-hexenyl, 3-methyl-1-pentenyl, 1,5-hexadienyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicodecenyl and the like. Alkenyl groups may be optionally substituted, i.e. unsubstituted or substituted.

As used herein, the term "alkynyl" refers to divalent straight chain or branched chain unsaturated aliphatic groups containing at least one carbon-carbon triple bond and having from 2 to 20 carbon atoms, eg, 2, 3, 4, 5, 6, 7, 8, 9, 10, 11, 12, 13, 14, 15, 16, 17, 18, 19, or 20 carbon atoms. For example, the term alkynyl includes, but is not limited to, ethynyl, propynyl, butynyl, 1-butynyl, 2-butynyl, 2-methylpropynyl, 1-pentynyl, 2-pentynyl, 2-methylbut-1-ynyl, 3-methylbut-1-ynyl, 2-methylbut-2-ynyl, 1-hexynyl, 2-hexynyl, 3-hexynyl, 2,2-dimethyl-2-butynyl, 2-methyl-2-hexynyl, 3-methyl-1-pentynyl, 1,5-hexadiynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicodecynyl and the like. Alkynyl groups may be optionally substituted, i.e. unsubstituted or substituted.

The term "carbocycle", or variants such as "carbocyclic ring" as used herein, includes within its meaning any stable 3, 4, 5, 6, or 7-membered monocyclic or bicyclic or 7, 8, 9, 10, 11, 12, or 13-membered bicyclic or tricyclic, any of which may be saturated, partially unsaturated, or aromatic. The term "carbocycle" includes within its meaning cycloalkyl, cycloalkenyl and aryl groups. Examples of such carbocycles include, but are not limited to, cyclopropyl, cyclobutyl, cyclopentyl, cyclohexyl, cycloheptyl, adamantyl, cycloodyl, [3.3.0]bicyclooctane, [4.3.0]bicyclononane, [4.4.0]bicyclodecane (decalin), [2.2.2]bicyclooctane, fluorenyl, phenyl, naphthyl, indanyl, adamantyl, or tetrahydronaphthvl (tetralin). Preferred carbocycles, unless otherwise specified, are cyclopropyl, cyclobutyl, cyclopentyl, cyclohexyl, phenyl, naphthyl, and indanyl. Carbocycles may be optionally substituted, i.e. unsubstituted or substituted.

The term "cycloalkyl" as used herein refers to a non-aromatic mono- or multicyclic ring system comprising about 3 to about 10 carbon atoms, e.g. 3, 4, 5, 6, 7, 8, 9, 10 carbon atoms. The cycloalkyl can be optionally substituted (i.e. unsubstituted or substituted) with one or more "ring system substituents" which may be the same or different, and are as defined herein. Non-limiting examples of suitable monocyclic cycloalkyls include cyclopropyl, cyclopentyl, cyclohexyl, cycloheptyl and the like. Non-limiting examples of suitable multicyclic cycloalkyls include 1-decalinyl, norbornyl, adamantyl and the like. Further non-limiting examples of cycloalkyl include the following:

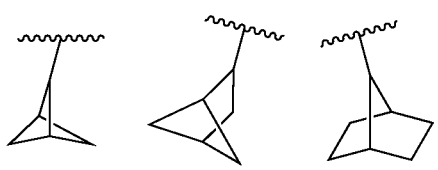

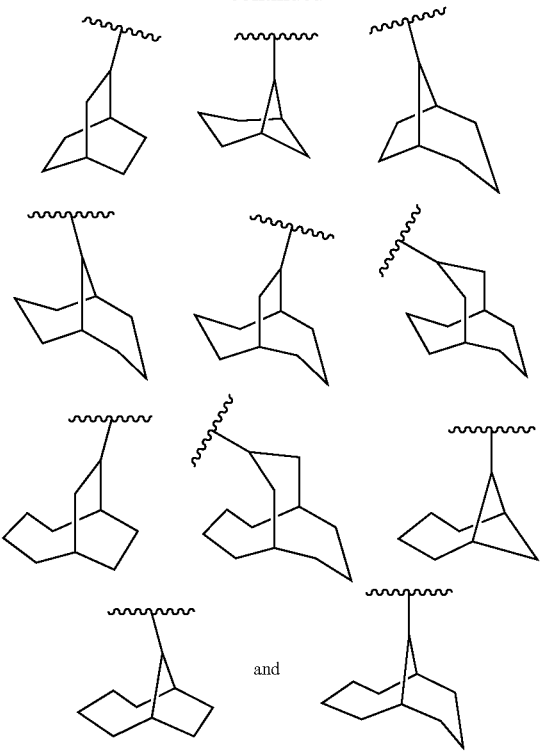

and

The term "cycloalkenyl" as used herein refers to a non-aromatic mono or multicyclic ring system comprising about 3 to about 10 carbon atoms, e.g. 3, 4, 5, 6, 7, 8, 9, 10 carbon atoms, which contains at least one carbon-carbon double bond. Non-limiting examples of suitable monocyclic cycloalkenyls include cyclopentenyl, cyclohexenyl, cyclohepta-1,3-dienyl, and the like. Non-limiting example of a suitable multicyclic cycloalkenyl is norbornylenyl, as well as unsaturated moieties of the examples shown above for cycloalkyl. Cycloalkenyl groups may be optionally substituted, i.e. unsubstituted or substituted.

The term "aryl", or variants such as "aromatic group" or "arylene" as used herein refers to monovalent ("aryl") and divalent ("arylene") single, polynuclear, conjugated or fused residues of aromatic hydrocarbons having from 6 to 12 carbon atoms, e.g. 6, 7, 8, 9, 10, 11, 12 carbon atoms. Such groups include, for example, phenyl, biphenyl, naphthyl, phenanthrenyl, and the like. Aryl groups may be optionally substituted, i.e. unsubstituted or substituted.

The term "heteroaryl" as used herein refers to an aromatic monocyclic or multicyclic ring system comprising about 5 to about 14 ring atoms (e.g. 5, 6, 7, 8, 9, 10, 11, 12, 13, 14 ring atoms), preferably about 5 to about 10 ring atoms (e.g. 5, 6, 7, 8, 9, 10 ring atoms), in which one or more of the ring atoms is an element other than carbon, for example nitrogen, oxygen or sulfur, alone or in combination. "Heteroaryl" may also include a heteroaryl as defined above fused to an aryl as defined above. Non-limiting examples of suitable heteroaryls include pyridyl, pyrazinyl, furanyl, thienyl, pyrimidinyl, pyridone (including N-substituted pyridones), isoxazolyl, isothiazolyl, oxazolyl, thiazolyl, pyrazolyl, furazanyl, pyrrolyl, pyrazolyl, triazolyl, 1,2,4-thiadiazolyl, pyrazinyl, pyridazinyl, quinoxalinyl, phthalazinyl, oxindolyl, imidazo[1,2-]pyridinyl, imidazo[2,1-b]thiazolyl, benzofurazanyl, indolyl, azaindolyl, benzimidazolyl, benzothienyl, quinolinyl, imidazolyl, thienopyridyl, quinazolinyl, thienopyrimidyl, pyrrolopyridyl, imidazopyridyl, isoquinolinyl, benzoazaindolyl, 1,2,4-triazinyl, benzothiazolyl and the like. The term "heteroaryl" also refers to partially saturated heteroaryl moieties such as, for example, tetrahydroisoquinolyl, tetrahydroquinolyl and the like. Heteroaryl groups may be optionally substituted, i.e. unsubstituted or substituted.

The term "heterocycle" as used herein refers to a group comprising a covalently closed ring herein at least one atom forming the ring is a carbon atom and at least one atom forming the ring is a heteroatom. Heterocyclic rings may be formed by 3, 4, 5, 6, 7, 8, 9, or more than 9 atoms, any of which may be saturated, partially unsaturated, or aromatic. Any number of those atoms may be heteroatoms (i.e., a heterocyclic ring may comprise one, two, three, four, five, six, seven, eight, nine, or more than nine heteroatoms). Herein, whenever the number of carbon atoms in a heterocycle is indicated (e.g., $C_1$-$C_6$ heterocycle), at least one other atom (the heteroatom) must be present in the ring. Designations such as "$C_1$-$C_6$heterocycle" refer only to the number of carbon atoms in the ring and do not refer to the total number of atoms in the ring. It is understood that the heterocylic ring will have additional heteroatoms in the ring. In heterocycles comprising two or more heteroatoms, those two or more heteroatoms may be the same or different from one another. Heterocycles may be optionally substituted, i.e. unsubstituted or substituted. Binding to a heterocycle can be at a heteroatom or via a carbon atom. Examples of heterocycles include heterocycloalkyls (where the ring contains fully saturated bonds) and heterocycloalkenyls (where the ring contains one or more unsaturated bonds) such as, but are not limited to the following:

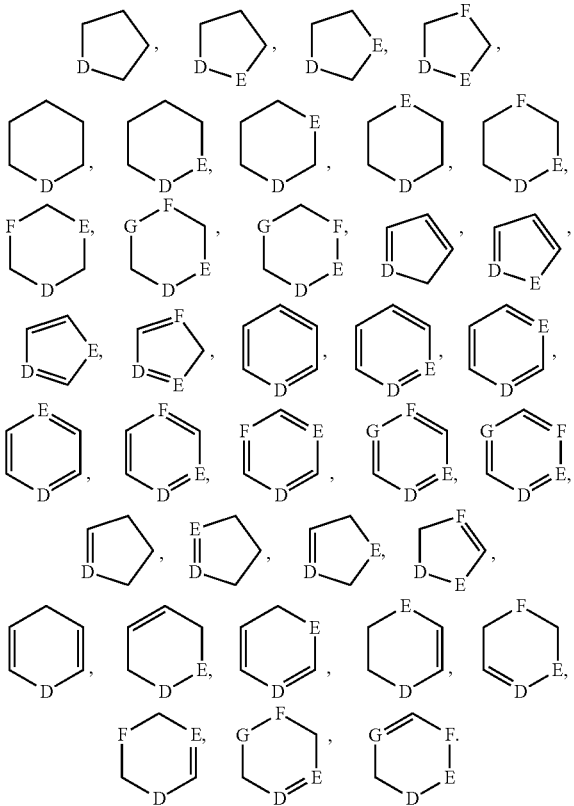

wherein D, E, F, and G independently represent a heteroatom. Each of D, E, F, and G may be the same or different from one another.

The term "halogen", or variants such as "halide" or "halo" as used herein, includes within its meaning fluorine, chlorine, bromine and iodine.

The term "optionally substituted" as used herein means the group to which this term refers may be unsubstituted, or may be substituted with one, two, three or more groups other than hydrogen provided that the indicated atom's normal valency is not exceeded, and that the substitution results in a stable compound. Such groups may be, for example, halogen, hydroxy, oxo, cyano, nitro, alkyl, alkoxy, haloalkyl, haloalkoxy, aryl alkoxy, alkylthio, hydroxyalkyl, alkoxyalkyl, cycloalkyl, cycloalkylalkoxy, alkanoyl, alkoxycarbonyl, alkylsulfonyl, alkylsulfonyloxy, alkylsulfonylalkyl, arylsulfonyl, arylsulfonyloxy, arylsulfonylalkyl, alkylsulfonamido, alkylamido, alkylsulfonamidoalkyl, alkylamidoalkyl, arylsulfonamido, arylcarboxamido, arylsulfonamidoalkyl, arylcarboxamidoalkyl, aroyl, aroyl-4-alkyl, arylalkanoyl, acyl, aryl, arylalkyl, alkylaminoalkyl, a group $R^xR^yN-$, $R^xOCO(CH_2)_m$, $R^xCON(R^y)(CH_2)_m$, $R^xR^yNCO(CH_2)_m$, $R^xR^yNSO_2(CH_2)_m$ or $R^xSO_2NR^y(CH_2)_m$ (where each of $R^x$ and $R^y$ is independently selected from hydrogen or alkyl, or where appropriate $R^xR^y$ forms part of carbocyclic or heterocyclic ring and m is 0, 1, 2, 3 or 4), a group $R^xR^yN(CH_2)_p-$ or $R^xR^yN(CH_2)_pO-$ (wherein p is 1, 2, 3 or 4); wherein when the substituent is $R^xR^yN(CH_2)_p-$ or $R^xR^yN(CH_2)_pO$, $R^x$ with at least one $CH_2$ of the $(CH_2)_p$ portion of the group may also form a carbocyclyl or heterocyclyl group and $R^y$ may be hydrogen, alkyl.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

In oilfields, many problems like treatment of mixed scales and metal naphthenates, and stimulation of wetted rock surfaces defy conventional solutions. As both inorganic and organic species are present in mixed scales, attempts to dissolve these scales in either aqueous or organic based formulations are challenging. The present inventors have advantageously and surprisingly found that the use of microemulsions may be useful in treating mixed scales and metal naphthenates/naphthenic acids.

The microemulsions of the present disclosure may comprise a compound of Formula (I), a solvent, a surfactant and optionally a co-surfactant, wherein the ratio of the surfactant to the co-surfactant is about 100:0 to about 10:90:

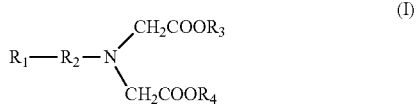
(I)

wherein:
$R_1$ is H, OH, or COORS;
$R_2$ is an optionally substituted branched or unbranched alkylene, alkenylene, or alkynylene; and
$R_3$, $R_4$, and $R_5$ are independently selected from H, an alkali metal ion, optionally substituted amino, or an optionally substituted ammonium group.

The microemulsions of the present disclosure may comprise a compound of Formula (I), a solvent, a surfactant and a co-surfactant, wherein the ratio of the surfactant to the co-surfactant is about 90:10 to about 10:90:

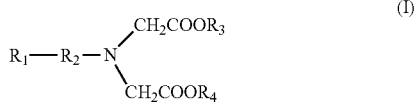
(I)

wherein:
$R_1$ is H, OH, or COORS;
$R_2$ is an optionally substituted branched or unbranched alkylene, alkenylene, or alkynylene; and
$R_3$, $R_4$, and $R_5$ are independently selected from H, an alkali metal ion, optionally substituted amino, or an optionally substituted ammonium group.

The microemulsion may be a stable microemulsion. The ratio of the surfactant to the co-surfactant may be in a range of about 100:0 to about 10:90. The ratio of the surfactant to the co-surfactant may be in a range of about 90:10 to about 10:90, 80:20 to about 20:80, about 70:30 to about 30:70, or the ratio of the surfactant to the co-surfactant may be about 90:10, about 85:15, about 80:20, about 75:25, about 70:30, about 65:35, about 60:40, about 55:45, about 50:50, about 45:55, about 40:60, about 35:65, about 30:70, about 25:75, about 20:80, about 15:85, about 10:90, or any range or ratio therebetween.

Advantageously, when the ratio of surfactant to co-surfactant is in this range, stable microemulsions may be obtained where no cloud point is reached. Further advantageously, when the ratio of surfactant to co-surfactant is in this range, minimal amounts of surfactant and co-surfactant may be required which would lead to cost savings.

The microemulsion may comprise a solution comprising a compound of Formula (I). The solution may be an aqueous solution. The solution comprising a compound of Formula (I) and solvent may be present in the micromeulsion in an amount at which the solubilization point of the microemulsion is achieved. The concentration of Formula (I) in solution may be in the range of about 10 wt % to about 60 wt %, about 15 wt % to about 60 wt %, about 20 wt % to about 60 wt %, about 25 wt % to about 60 wt %, about 30 wt % to about 60 wt %, about 35 wt % to about 60 wt %, about 40 wt % to about 60 wt %, about 45 wt % to about 60 wt %, about 50 wt % to about 60 wt %, about 55 wt % to about 60 wt %, about 10 wt % to about 55 wt %, about 10 wt % to about 50 wt %, about 10 wt % to about 45 wt %, about 10 wt % to about 40 wt %, about 10 wt % to about 35 wt %, about 10 wt % to about 30 wt %, about 10 wt % to about 25 wt %, about 10 wt % to about 20 wt %, about 10 wt % to about 15 wt %, or about 20 wt %, about 25 wt %, about 30 wt %, about 35 wt %, about 40 wt %, about 45 wt %, about 55 wt %, about 60 wt %, or any value or range therein. The solution may comprise water and/or inorganic acid such as HCl. Inorganic acid (such as HCl) may be added to the solution to adjust the pH.

The ratio of the solution comprising a compound of Formula (I) and the solvent may be in the range of about 20:80 to about 80:20. The ratio of the solution comprising a compound of Formula (I) and the solvent may be about 20:80, about 25:75, about 30:70, about 35:65, about 40:60, about 45:55, about 50:50, about 55:45, about 60:40, about 65:35, about 70:30, about 75:25, about 80:20, or any range or ratio therebetween.

The optimal ratio of surfactant to the co-surfactant may be arrived at by providing an immiscible mixture of a solution comprising a compound of formula (I) and solvent at fixed ratios with respect to each other, and titrating solutions of surfactant and co-surfactant, wherein each solution of surfactant and co-surfactant comprises surfactant and co-surfactant in different ratios with respect to each other. The optimal ratio of surfactant and co-surfactant is arrived at when solubilisation point (or a stable microemulsion) is achieved (i.e. where transparency is reached), and there is no cloud point (appearance of turbidity).

In the compound of Formula (I), $R_1$ may be H, OH, or COORS. $R^5$ may be selected from H, an alkali metal ion, an optionally substituted amino, or an optionally substituted ammonium group. The alkali metal ion may be selected from the group consisting of sodium, or potassium ions.

In the compound of Formula (I), $R_2$ may be an optionally substituted branched or unbranched alkylene, optionally substituted branched or unbranched alkenylene, or optionally substituted branched or unbranched alkynylene. $R_2$ may be optionally substituted branched or unbranched $C_1$ to $C_6$ alkylene (i.e. 1, 2, 3, 4, 5, 6 carbon atoms), optionally substituted branched or unbranched $C_2$ to $C_6$ alkenylene (i.e. 2, 3, 4, 5, 6 carbon atoms), or optionally substituted branched or unbranched $C_2$ to $C_6$ alkynylene (i.e. 2, 3, 4, 5, 6 carbon atoms). The branched or unbranched alkylene, alkenylene or alkynylene of $R_2$ may be unsubstituted or substituted. $R_2$ may be unsubstituted or substituted with one or more substituents selected from the group consisting of OH, cyano, halogen, optionally substituted alkoxy, optionally substituted amino, optionally substituted acyl, optionally substituted cycloalkyl, optionally substituted cycloalkenyl, optionally substituted heterocycloalkyl, optionally substituted aryl, optionally substituted heteroaryl, or —COORS wherein $R_7$ is independently selected from H, alkyl, an alkali metal ion, optionally substituted amino, or an optionally substituted ammonium group. The alkali metal ion may be selected from the group consisting of sodium, or potassium ions. $R_2$ may be a $C_{1-6}$ branched or unbranched alkylene substituted with one or more —COOH. $R_2$ may be a $C_{1-3}$ branched or unbranched alkylene substituted with one or more —COOH. $R_2$ may be a $C_{1-3}$ unbranched alkylene substituted with one or more —COOH. $R_2$ may be a $C_{1-3}$ unbranched alkylene substituted with one —COOH.

In the compound of Formula (I), $R_3$ may be H, an alkali metal ion, an optionally substituted amino, or an optionally substituted ammonium group. The alkali metal ion may be selected from the group consisting of sodium, or potassium ions.

In the compound of Formula (I), $R_4$ may be H, an alkali metal ion, an optionally substituted amino, or an optionally substituted ammonium group. The alkali metal ion may be selected from the group consisting of sodium, or potassium ions.

The compound of Formula (I) may be selected from the group consisting of Formulas (IA) and (IB):

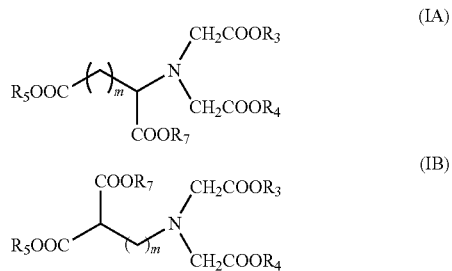

where m is an integer between 1 and 5.

The compound of Formula (I) may comprise two, three, four, five, six or more ester (—C(O)O—) groups. The compound of Formula (I) may comprise two, three, four, five, six or more carboxylic acid (—C(O)OH) groups.

The compound of Formula (I) may be an iminoacetic acid or salt thereof. The iminoacetic acid may comprise two, three, four, five, six or more ester (—C(O)O—) groups. The iminoacetic acid may comprise two, three, four, five, six or more carboxylic acid (—C(O)OH) groups.

The compound of Formula (I) may be glutamic acid N,N-di acetic acid (GLDA) or salts thereof:

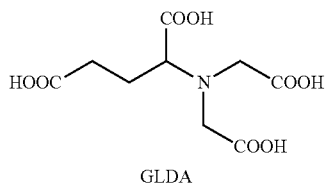

GLDA

The compound of Formula (I) may be selected from the group consisting of glutamic acid N,N-diacetic acid (GLDA), L-glutamic acid N,N-diacetic acid (L-GLDA), D-glutamic acid N,N-diacetic acid (D-GLDA), mixture of stereoisomers and salts thereof.

The salt of a compound of formula (I) may be a sodium, potassium or ammonium salt.

The salt of a compound of formula (I) may be a sodium salt of GLDA, a potassium salt of GLDA, or an ammonium salt of GLDA.

The compound of Formula (I) may be a chelating agent. Advantageously, the use of GLDA, or salt thereof, as a chelating agent may enable the microemulsion formulation to be at pH levels that are as low as 1.7. More advantageously, the low pH values may improve hydrolysis of the metal naphthenates, dissolution of mixed scales and stimulation of carbonate reservoirs. In contrast, other chelating agents such as Ethylenediaminetetraacetic acid (EDTA) are insoluble below pH 7, but are highly soluble at alkaline pH levels. Alkaline pH levels (above 7) may be undesirable as the rate of reaction of the microemulsion formulation with scales such as calcium carbonate ($CaCO_3$) becomes very slow, which renders such microemulsions useless. Further advantageously, GLDA may be an environmentally friendly chemical that can be used in cleaning, scale removal in the pipelines as well as stimulation of oil well.

Formula (I) in solution may have a pH value of about 1.7 to about 4.0, or about 1.7 to about 3.5, or about 1.7 to about 3.0, or about 1.7 to about 2.5, or about 1.7 to about 2.0, or about 1.0 to about 4.0, or about 1.5 to about 4.0, or about 2.0 to about 4.0, or about 2.5 to about 4.0, or about 3.0 to about 4.0, or about 3.5 to about 4.0. The solution may comprise water and/or inorganic acid such as HCl. Inorganic acid (such as HCl) may be added to adjust the pH of the solution.

Advantageously, the microemulsions of the present disclosure are able to dissolve mixed calcite scales. Mixed calcite scales can be wetted scales where some organic matter (typically <30%) remains so imbedded in the calcite matrix that it does not respond to dissolving chemicals like hydrochloric acid, acetic acid or GLDA alone. Mixed scales could also be predominantly organic scales which have some calcite precipitated within organic matrix. Such scales if treated by solvent based chemicals generally produce a sludge which may clog pipelines or tubings. Advantageously and surprisingly, such types of scales can be treated by various embodiments of the disclosure. The microemulsions disclosed herein advantageously may be able to effectively dissolve both inorganic and organic species.

Further advantageously, the microemulsions of the present disclosure may be capable of effectively dissolving metal naphthenates/naphthenic acids. This is highly advantageous as metal naphthenate/naphthenic acid scales remain largely untreated in the oil industry.

The solvent of the microemulsion may be a solvent capable of dissolving organic components. The solvent may be an organic solvent. The solvent may be aliphatic or aromatic solvent. The solvent may be a hydrocarbon mixture. The organic solvent may be selected from the group consisting of kerosene, naphtha, light aromatic naphtha, heavy aromatic naphtha, benzene, trimethyl benzene, Solvesso-150, toluene, xylene, methyl palm ester and mixtures thereof. Solvesso-150 contains heavy aromatic naphtha and is available from ExxonMobil Chemical. The compound of Formula (I) and solvent may be present in an amount in which the solubilization point (or a stable microemulsion) of the microemulsion is reached. The compound of Formula (I) and solvent may be present in an amount in which there is no cloud point.

The surfactant may be selected from the group consisting of alcohol ethoxylates, oxoalcohol ethoxylates, alkyl alcohol ethoxylates, tridecyl alcohol ethoxylates, oleyl alcohol ethoxylates, synthetic alcohol ethoxylates, natural fatty alcohol ethoxylates, tributylphenol ethoxylates, stearyl alcohol ethoxylates, nonylphenol ethoxylates, ethylene oxide-propylene oxide block polymers, alcohol alkoxylates, tristyrylphenol ethoxylates, fatty acid ethoxylates, fatty amine ethoxylates, castor oil ethoxylates, fatty acid polyglycerol esters, alkyl and olefin sulfonates, sulfate esters, sulfosuccinic acid derivatives, alkyl sulfosuccinates, dioctyl sulfosuccinate (DOSS or AOT), linear alkyl benzene sulphonic acids (LABSA), branched alkyl benzene sulphonic acids dodecyl benzene sulfonic acid, phosphate esters, alkyl phosphonic acids, alkyl ether carboxylic acids, and/or fatty acid derivatives. The surfactant may be a compound of formula (II):

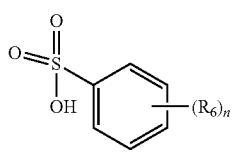

wherein $R_6$ is an optionally substituted branched or unbranched alkyl, optionally substituted branched or unbranched alkenyl, or optionally substituted branched or unbranched alkynyl.

$R_6$ may be an optionally substituted branched or unbranched alkyl, optionally substituted branched or unbranched alkenyl, or optionally substituted branched or unbranched alkynyl. $R_6$ may be optionally substituted branched or unbranched $C_1$ to $C_{20}$ alkyl (i.e. 1, 2, 3, 4, 5, 6, 7, 8, 9, 10, 11, 12, 13, 14, 15, 16, 17, 18, 19, 20 carbon atoms), optionally substituted branched or unbranched $C_2$ to $C_{20}$ alkneyl (i.e. 2, 3, 4, 5, 6, 7, 8, 9, 10, 11, 12, 13, 14, 15, 16, 17, 18, 19, 20 carbon atoms), or optionally substituted branched or unbranched $C_2$ to $C_{20}$ alkynyl (i.e. 2, 3, 4, 5, 6, 7, 8, 9, 10, 11, 12, 13, 14, 15, 16, 17, 18, 19, 20 carbon atoms). The branched or unbranched alkyl, alkenyl or alkynyl of $R_6$ may be unsubstituted or substituted. $R_6$ may be unsubstituted or substituted with one or more substituents selected from the group consisting of OH, cyano, halogen, optionally substituted alkoxy, optionally substituted amino, optionally substituted acyl, optionally substituted cycloalkyl, optionally substituted cycloalkenyl, optionally substituted heterocycloalkyl, optionally substituted aryl, optionally substituted heteroaryl, or —COORS wherein $R_7$ is independently selected from H, alkyl, or optionally substituted amino. $R_6$ may be an unbranched or branched $C_{10}$-$C_{18}$ unsubstituted or substituted alkyl, alkenyl or alkynyl. $R_6$ may be an unbranched or branched $C_{10}$-$C_{18}$ unsubstituted or substituted alkyl, alkenyl or alkynyl. $R_6$ may be an unbranched or branched $C_{12}$ unsubstituted or substituted alkyl. $R_6$ may be an unbranched $C_{10}$-$C_{18}$ unsubstituted or substituted alkyl. $R_6$ may be a $C_{10}$-$C_{15}$ unsubstituted or substituted alkyl. $R_6$ may be a Cm-CD unsubstituted or substituted alkyl.

n may be an integer from 1 to 5. n may be 1, 2, 3, 4, or 5.

The surfactant may be a linear alkyl benzenesulfonic acid (LABSA). The surfactant may be a linear $C_{1-20}$ alkyl benzenesulfonic acid (LABSA). The surfactant may be a $C_1$ LABSA, a $C_2$ LABSA, a $C_3$ LABSA, a $C_4$ LABSA, a $C_5$ LABSA, a $C_6$ LABSA, a $C_7$ LABSA, a $C_8$ LABSA, a $C_9$ LABSA, a $C_{10}$ LABSA, a $C_{11}$ LABSA, a $C_{12}$ LABSA, a $C_{13}$ LABSA, a $C_{14}$ LABSA, a $C_{15}$ LABSA, a $C_{16}$ LABSA, a $C_{17}$ LABSA, a $C_{18}$ LABSA, a $C_{19}$ LABSA, a $C_{20}$ LABSA, or combinations thereof. The surfactant may be linear methyl benzene sulfonic acid, ethyl benzene sulfonic acid, propyl benzene sulfonic acid, butyl benzene sulfonic acid, pentyl benzene sulfonic acid, hexyl benzene sulfonic acid, heptyl benzene sulfonic acid, octyl benzene sulfonic acid, nonyl benzene sulfonic acid, decyl benzene sulfonic acid, undecyl benzene sulfonic acid, dodecyl benzene sulfonic acid, tridecyl benzene sulfonic acid, tetradecyl benzene sulfonic acid, pentadecyl benzene sulfonic acid, hexadecyl benzene sulfonic acid, heptadecyl benzene sulfonic acid, octadecyl benzene sulfonic acid, nonadecyl benzene sulfonic acid, undecyl eicosyl benzene sulfonic acid, or combinations thereof.

The surfactant may be selected from the group consisting of formulas (IIa) to (III):

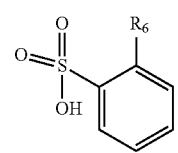

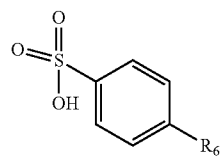

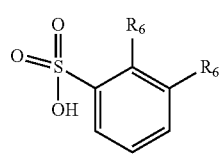

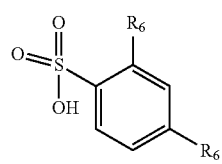

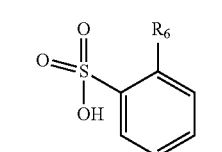

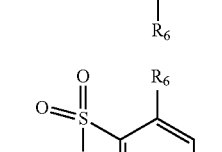

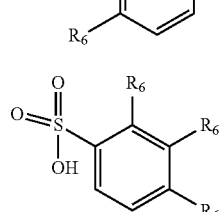

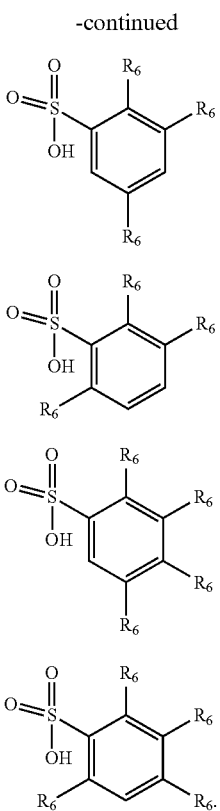

The co-surfactant of the microemulsion may enhance the effectiveness of the surfactant. The co-surfactant may increase the oil-solubilizing capacity of the microemulsion and lower the interfacial tension of the microemulsion.

The co-surfactant of the microemulsion may be selected from the group consisting of alcohols, ethers, glycol ethers, and mixtures thereof. The co-surfactant may be propanol (such as 1-propanol or 2-propanol), butanol (such as 1-butanol, 2-butanol, isobutanol, or tert-butanol), pentanol, hexanol, alkylene glycol alkyl ether, or mixtures thereof. The co-surfactant may be propanol, butanol, pentanol, hexanol, ethylene glycol monomethyl ether, ethylene glycol monoethyl, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, ethylene glycol dimethyl ether, ethylene glycol diethyl ether, ethylene glycol dibutyl ether, ethylene glycol methyl ether acetate, ethylene glycol monoethyl ether acetate, ethylene glycol monobutyl ether acetate, propylene glycol methyl ether acetate, polyethylene glycol or polypropylene glycol. The co-surfactant may be n-butanol or ethylene glycol monoethyl ether, or mixtures thereof.

The ratio of surfactant to co-surfactant may be in the range of about 50:50 to 60:40, preferably 50:50, or 55:45, or 60:40, and the ratio of the solution of a compound of Formula (I) to solvent may be in the range of about 60:40 to about 40:60, preferably 60:40, or 50:50, or 40:60.

The microemulsion may comprise a solution of glutamic acid N,N-di acetic acid (GLDA) or salts thereof, LABSA as the surfactant, a solvent, and optionally a co-surfactant.

The ratio of LABSA to co-surfactant may be in the range of about 50:50 to 60:40, preferably 50:50, or 55:45, or 60:40, and the ratio of GLDA (or salts thereof) to solvent may be in the range of about 60:40 to about 40:60, preferably 60:40, or 50:50, or 40:60.

The microemulsion (Microemulsion A) may comprise or consist of a solution of glutamic acid N,N-di acetic acid (GLDA) or salts thereof, solvent, compound(s) of formula (II) and n-butanol.

The microemulsion (Microemulsion B) may comprise or consist of a solution of glutamic acid N,N-di acetic acid (GLDA) or salts thereof, solvent, compound(s) of formula (II) and ethylene glycol monobutyl ether (EGMBE).

The microemulsion (Microemulsion A1) may comprise or consist of a solution of glutamic acid N,N-di acetic acid (GLDA) or salts thereof, solvent, LABSA and n-butanol.

The microemulsion (Microemulsion B1) may comprise or consist of a solution of glutamic acid N,N-di acetic acid (GLDA) or salts thereof, solvent, LABSA and ethylene glycol monobutyl ether (EGMBE).

The microemulsion (Microemulsion A2) may comprise or consist of a solution of glutamic acid N,N-di acetic acid (GLDA) or salts thereof, kerosene, LABSA and n-butanol.

The microemulsion (Microemulsion B2) may comprise or consist of a solution of glutamic acid N,N-di acetic acid (GLDA) or salts thereof, kerosene, LABSA and ethylene glycol monobutyl ether (EGMBE).

The microemulsion (Microemulsion A3) may comprise or consist of a solution of glutamic acid N,N-di acetic acid (GLDA) or salts thereof, Solvesso-150, LABSA and n-butanol.

The microemulsion (Microemulsion B3) may comprise or consist of a solution of glutamic acid N,N-di acetic acid (GLDA) or salts thereof, Solvesso-150, LABSA and ethylene glycol monobutyl ether (EGMBE).

The microemulsion (Microemulsion A4) may comprise or consist of a solution of glutamic acid N,N-di acetic acid (GLDA) or salts thereof, heavy aromatic naphtha, LABSA and n-butanol.

The microemulsion (Microemulsion B4) may comprise or consist of a solution of glutamic acid N,N-di acetic acid (GLDA) or salts thereof, heavy aromatic naphtha, LABSA and ethylene glycol monobutyl ether (EGMBE). The GLDA (or salts thereof) may be in a solution. The solution may comprise water and/or inorganic acid, such as HCl.

In Microemulsions A, A1, A2, A3, A4, B, B1, B2, B3, and B4, the ratio of surfactant to co-surfactant may be in the range of about 50:50 to about 60:40. The ratio of surfactant to co-surfactant may be in the range of about 50:50, about 55:45, or about 60:40. When the ratio of surfactant to co-surfactant is in the range of about 50:50 to about 60:40, the ratio of solution of GLDA (or salts thereof) to solvent may be about 20:80 to about 80:20. The ratio of solution of GLDA to solvent may be about 20:80, about 25:75, about 30:70, about 35:65, about 40:60, about 45:55, about 50:50, about 55:45, about 60:40, about 65:35, about 70:30, about 75:25, about 80:20, or any range or ratio therebetween. Advantageously, when the components of the microemulsions are in these ratios, solubilisation point may be achieved (i.e. where transparency is reached), and there is no cloud point (appearance of turbidity). A stable microemulsion may be achieved.

The GLDA (or salts thereof) in solution may have a pH value of about 1.7 to about 4.0, or about 1.7 to about 3.5, or about 1.7 to about 3.0, or about 1.7 to about 2.5, or about 1.7 to about 2.0, or about 1.0 to about 4.0, or about 1.5 to about 4.0, or about 2.0 to about 4.0, or about 2.5 to about 4.0, or about 3.0 to about 4.0, or about 3.5 to about 4.0.

Advantageously, GLDA (and salts thereof) may remain soluble for pH as low as pH 1.7. This may advantageously lead to better hydrolysis of metal naphthenates/naphthenic acids in mixed scales.

The microemulsion may have a droplet size in the nanometer range. The microemulsion may have an average droplet size of less than about 200 nm, or less than about 195 nm, less than about 190 nm, less than about 185 nm, less than about 180 nm, less than about 175 nm, less than about 170 nm, less than about 165 nm, less than about 160 nm, less than about 155 nm, less than about 150 nm, less than about 145 nm, less than about 140 nm, less than about 135 nm, less than about 130 nm, less than about 125 nm, less than about 120 nm, less than about 115 nm, less than about 100 nm, or less than about 95 nm. The average droplet size of the microemulsion may be about 95 nm, about 100 nm, about 105 nm, about 110 nm, about 115 nm, about 120 nm, about 125 nm, about 130 nm, about 135 nm, about 140 nm, about 145 nm, about 150 nm, about 155 nm, about 160 nm, about 165 nm, about 170 nm, about 175 nm, about 180 nm, about 185 nm, about 190 nm, about 195 nm, or about 200 nm.

Advantageously, the small droplet size may increase the surface area of the dispersed phase.

The microemulsions may be transparent. Transparency in their appearance may be due to microemulsion droplets having a droplet size of less than 140 nm.

The microemulsions may be water-in-oil (W/O) or oil-in-water (O/W) emulsions.

The present disclosure also relates to a method for preventing or removing formation of organic deposits and/or inorganic deposits, metal naphthenates, naphthenic acids and/or mixtures thereof from subterranean formations comprising the steps of:
  (i) providing a microemulsion comprising a compound of Formula (I), a solvent, a surfactant and optionally a co-surfactant, wherein the ratio of the surfactant to the co-surfactant is about 100:0 to about 10:90:

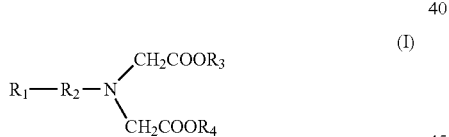

wherein:
  $R_1$ is H, OH, or COORS;
  $R_2$ is an optionally substituted branched or unbranched alkylene, alkenylene, or alkynylene;
  $R_3$, $R_4$, and $R_5$ are independently selected from H, an alkali metal ion, optionally substituted amino, or an optionally substituted ammonium group, and
  (ii) introducing the microemulsion into a subterranean formation.

$R_1$, $R_2$, $R_3$, $R_4$, $R_5$ may be as defined above.

The inorganic deposits may comprise metal anion salts. The anion may be selected from the group consisting of sulfates, sulfides, chlorides, chlorites, carbonates, oxalates, hydroxides, oxides, silicates, and phosphates. The metal ions in the inorganic deposits may be selected from the group consisting of transition metals, alkali metals, and alkaline earth metals. The metal cation may be iron ions, and chromium ions. The inorganic deposits may be a mineral selected from the group consisting of calcite, aragonite, anhydrite, gypsum, hemihydrate, and beerstone. The inorganic deposit may be calcium carbonate.

The organic deposits may comprise wax, asphaltenes, resins, naphthenic acids and metal naphthenates. The organic deposits may also be sludge formed due to well interventions like acidization or fracturing.

The disclosed method may further comprise the step of contacting the microemulsion with the organic deposits, inorganic deposits, metal naphthenates, naphthenate acids and/or mixtures formed on a surface of a downhole pipeline.

The microemulsion may be introduced into the subterranean formation by injection.

The microemulsion may be in contact with the organic deposits, inorganic deposits, metal naphthenates, naphthenate acids, or mixtures thereof for a period of about 9 hours to about 15 hours, or about 10 hours to about 15 hours, or about 11 hours to about 15 hours, or about 12 hours to about 15 hours, or about 13 hours to about 15 hours, or about 14 hours to about 15 hours, or about 10 hours to about 14 hours, or about 10 hours to about 13 hours, or about 10 hours to about 12 hours, or about 10 hours to about 11 hours. The contacting period may be about 9 hours, or about 10 hours, or about 11 hours or about 12 hours, or about 13 hours, or about 14 hours, or about 15 hours.

The present disclosure further relates to a method for stimulating a carbonate reservoir in a subterranean formation, comprising injecting a microemulsion into the subterranean formation, wherein the microemulsion comprises a solution comprising a compound of Formula (I), a solvent, a surfactant and optionally a co-surfactant, wherein the ratio of the surfactant to the co-surfactant is about 100:0 to about 10:90:

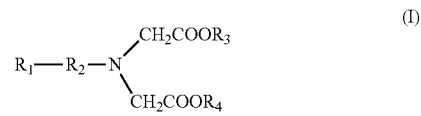

wherein:
  $R_1$ is H, OH, or COORS;
  $R_2$ is an optionally substituted branched or unbranched alkylene, alkenylene, or branched or unbranched alkynylene;
  $R_3$, $R_4$, and $R_5$ are independently selected from H, an alkali metal ion, optionally substituted amino.

The injection rate into a core plug of diameter 3.81 cm (1.5 inch) and length 7.62 cm (3 inch) may be in the range of about 0.5 ml/min to about 4.5 ml/min, or about 0.75 ml/min to about 4.5 ml/min, or about 1.0 ml/min to about 4.5 ml/min, or about 1.5 ml/min to about 4.5 ml/min, or about 2.0 ml/min to about 4.5 ml/min, or about 2.5 ml/min to about 4.5 ml/min, or about 3.0 ml/min to about 4.5 ml/min, or about 3.5 ml/min to about 4.5 ml/min, or about 4.0 ml/min to about 4.5 ml/min, or about 0.5 ml/min to about 4.0 ml/min, or about 0.5 ml/min to about 3.5 ml/min, or about 0.5 ml/min to about 3.0 ml/min, or about 0.5 ml/min to about 2.5 ml/min, or about 0.5 ml/min to about 2.0 ml/min, or about 0.5 ml/min to about 1.5 ml/min, or about 0.5 ml/min to about 1.0 ml/min, or about 0.5 ml/min to about 0.75 ml/min, or about 2.5 ml/min to about 3.5 ml/min. The injection rate may be upscaled for a well.

The microemulsion may be injected into well perforations. Each perforation may have a diameter of about 20 cm to about 50 cm, with a depth interval of about 3 m to about 650 m. The injection rate in the core depends on surface area of the core's side, the permeability and the applied pressure. The injection rate in core can be upscaled to injection rate in a well using the equation qw=qc×(2 rw×Lw)/rc^2, where qw=injection rate in the well, qc is the injection rate into the core, rw is the radius of the well, Lw is the length of well, and rc is the radius of the side of the core. A well, depending on the bit size, can be considered as a 31.115 cm (12.25 inch), 21.59 cm (8.5 inch), or likewise diameter cylinder of 3.048 m (10 feet) to 650 m (2133 ft) in length. Vertical wells are generally perforated for a maximum of 30.48 m (100 feet) to 60.96 m (200 feet), but horizontal wells may have a larger perforation interval or open hole section (i.e. treatment length). In some instances, the length may be 5000 ft (1524 m) or more. In the well, injection rate is expressed in barrels/minute (BPM). In the removal of mixed scales and metal naphthenates/naphthenic acids, the microemulsion formulation may be metered to the affected area and allowed to soak with the deposit for about 9 to about 15 hours. Metering of the microemulsion formulation may be preceded by a solvent preflush to clean the surface of the deposits and to remove any oil present. Metering of main formulation may then be proceeded by a postflush for placing the desired amount of microemulsion formulation at the desired place. After soaking, the normal flow of process fluids may be resumed.

In the treatment of subterranean formations, the same process may be applied. The microemulsion formulation may be injected into well perforations in the range of about 5 to about 100 gallon/ft (about 62.10 to about 1241.93 L/m), and an about 9 hour to about 15 hour soaking period may follow. The well may be subsequently flowed back. Preflush and post flush may be employed as described above.

The microemulsions of the present disclosure may be used in the stimulation of sand stone. This is advantageous as in many cases, damage is caused by the formation of mixed scales. By having the ability to dissolve mixed scales, the microemulsions of the present disclosure may be efficient in stimulating wells in sand stone reservoirs and its low reactivity will further allow for deep penetration.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 is a ternary phase diagram depicting a stability envelop of GLDA-Kerosene-LABSA-n-butanol microemulsion system with a LABSA:n-butanol ratio of 50:50.

FIG. 2 is a graph showing the concentration of dissolved calcium in a microemulsion comprising GLDA-Kerosene-LABSA-n-butanol of the present disclosure at various time intervals during a mixed scale dissolution test.

FIG. 3 is a graph showing the concentration of dissolved iron in a microemulsion comprising GLDA-Solvesso-150-LABSA-n-butanol of the present disclosure at various time intervals during a metal naphthenate dissolution test.

FIG. 4 is a graph showing the pore volumes for acid breakthrough in a carbonate formation at various injection rates using a microemulsion comprising GLDA-Solvesso 150-LABSA-EGMBE of the present disclosure during a carbonate core flooding test.

FIG. 5 is a computerized tomography (CT) scan of a carbonate core showing the geometry of a wormhole where the minimum pore volume for acid breakthrough ($PV_{BTmin}$) was achieved during a core flooding test.

EXAMPLES

Non-limiting examples of the invention and a comparative example will be further described in greater detail by reference to specific Examples, which should not be construed as in any way limiting the scope of the invention.

Materials

GLDA was obtained from AkzoNobel as 40% solution by brand name Dissolvine StimWell HTF. LABSA (96%) was obtained from ACME Chemicals, Port Klang, Malaysia. Reagent grade n-butanol and EGMBE were obtained from Sigma-Aldrich. Solvesso-150 was obtained from Exxon Mobil Chemicals.

Example 1—General Determination of Microemulsion Stability Envelopes

The stability envelopes for microemulsions of the present disclosure were determined by a two stage study using quasi-ternary diagrams.

In a first stage, an immiscible solution comprising a compound of Formula (I) and solvent was first provided, wherein their ratios with respect to one another were fixed. The immiscible mixture was then titrated with a solution of surfactant and co-surfactant, wherein the ratios of surfactant and co-surfactant were varied. When solubilisation point (transparency) was reached, the amount of solution of surfactant and co-surfactant was recorded and labelled "solubilisation point". Titration was further continued by addition of surfactant-co-surfactant solutions. Appearance of turbidity at any point showed cloud point and was also recorded. If the cloud point was not reached even after adding substantial surfactant-co-surfactant solution, the cloud point was assumed at a point representing surfactant-co-surfactant in that particular ratio (infinite dilution by surfactant-co-surfactant solution). Desirable (or "optimal") ratios of surfactant and co-surfactant were obtained when no cloud point was seen and the amount of surfactant and co-surfactant was minimal.

In the second stage, after obtaining an "optimal ratio" for the surfactant and co-surfactant, a solution of surfactant and co-surfactant where their ratios with respect to one another were fixed at the optimal ratio. This solution was used as a titrant against a solution comprising a compound of formula (I) and solvent where their ratios with respect to one another were varied. Similar to the first phase, solubilisation and cloud points were determined and a stability diagram expressed as a ternary diagram was drawn. The solubilization and cloud points fall on tie lines, which are the lines originating from solvent axis to 100% surfactant apex. For any ratio of solution of the formula (I) and solvent, if the cloud point was not observed, it was assumed that the titration ended at 100% surfactant concentration (the surfactant apex).

Advantageously, the stability envelope may be useful in deciding the concentration of the various components of the microemulsion to treat particular problems.

Example 2—Determination of Microemulsion Stability Envelope for GLDA-Kerosene-LABSA-n-Butanol With reference to FIG. 1, in a first stage, an immiscible solution comprising GLDA and kerosene was first provided, wherein their ratio with respect to one another was fixed at 50:50 (5 mL:5 mL). The immiscible mixture was then titrated with a solution of LABSA and n-butanol, wherein the ratios of LABSA and n-butanol were varied. When solubilisation point (transparency) and cloud point (appearance of turbidity) were reached, the amount of solution of LABSA and n-butanol was recorded and labelled "solubilisation point". The titration was further continued. In case turbidity appeared at any stage, it was recorded as cloud point. In case cloud point was not reached even after addition of 15 ml LABSA-n-butanol solution, the titration was terminated and the end point was assumed at points representing particular LABSA-n-butanol ratio at LABSA axis. The results of this first stage are shown in Table 1a and Table 1b. Although less concentration of surfactant-co-surfactant solution was required to reach solubilization point for ratios 60:40 and 55:45, these ratios could not be considered as optimal ratio because cloud points were seen. Such ratios could not provide a broader stability envelop in the next stage. Therefore, an optimal ratio was fixed at 50:50 LABSA:n-BuOH as no cloud point was seen and the amount of surfactant and co-surfactant used was minimal.

TABLE 1a

| GLDA Solution (ml) | Kerosene (ml) | LABSA:n-BuOH Ratio (v/v) | Solubilisation Point (ml) | Cloud Point (ml) |
| --- | --- | --- | --- | --- |
| 5 | 5 | 20:80 | 23.4 | No |
| 5 | 5 | 30:70 | 18.4 | No |
| 5 | 5 | 45:55 | 14.8 | No |
| 5 | 5 | 50:50 | 14.2 | No |
| 5 | 5 | 55:45 | 13.6 | 15.6 |
| 5 | 5 | 60:40 | 12.8 | 13.8 |

TABLE 1b

| GLDA Solution (g) | Kerosene (g) | LABSA:n-BuOH Ratio (v/v) | Solubilisation Point (g) | Cloud Point (g) |
| --- | --- | --- | --- | --- |
| 5.9 | 4 | 20:80 | 21.29 | No |
| 5.9 | 4 | 30:70 | 17.25 | No |
| 5.9 | 4 | 45:55 | 14.28 | No |
| 5.9 | 4 | 50:50 | 13.79 | No |
| 5.9 | 4 | 55:45 | 13.28 | 15.15 |
| 5.9 | 4 | 60:40 | 12.56 | 13.51 |

In the second stage, the ratio of LABSA and n-butanol was fixed at 50:50 and this solution was used as a titrant against a solution comprising GLDA and kerosene where their ratios with respect to one another were varied. The results of this-second stage are shown in Table 2a and Table 2b.

TABLE 2a

| GLDA Solution (ml) | Kerosene (ml) | Solubilization Point with 1:1 LABSA-n-BuOH ratio (ml) | Cloud Point (ml) |
| --- | --- | --- | --- |
| 2 | 8 | 16.4 | No |
| 4 | 6 | 15.4 | No |
| 5 | 5 | 14.2 | No |
| 6 | 4 | 13.4 | No |
| 8 | 2 | 11.8 | No |

TABLE 2b

| GLDA Solution (g) | Kerosene (g) | Solubilization Point with 1:1 LABSA-n-BuOH ratio (g) | Cloud Point (g) |
| --- | --- | --- | --- |
| 2.36 | 6.4 | 14.68 | No |
| 4.72 | 4.8 | 14.52 | No |
| 5.90 | 4.0 | 13.79 | No |
| 7.08 | 3.2 | 13.43 | No |
| 9.44 | 1.6 | 12.84 | No |

As shown in Tables 2a and 2b, using an optimal ratio of 50:50 LABSA:n-BuOH resulted in solubilisation points being achieved in all proportions of GLDA and kerosene. No cloud point was observed in any of the above runs. Therefore, it may be concluded that the system may remain stable over a large envelope as shown in FIG. 1. As known to experts in the art, the solubilization and cloud points fall on tie lines. Tie lines in FIG. 1 start from particular concentration points of GLDA-kerosene at the kerosene axis to the 100% surfactant apex. In case cloud points were not observed at the end of the titration, the cloud point was assumed at the surfactant apex. As no cloud point was observed, the stability envelope was extended to the apex of the ternary diagram, which represent 100% LABSA:n-BuOH surfactant phase. Additionally, as shown in FIG. 1, increasing the solvent phase required more surfactant solution to reach solubility point, which may mean that an O/W type of emulsion is the preferred form for this system.

Example 3—Dissolution of Mixed Scales

A microemulsion of GLDA-Kerosene-LABSA-n-Butanol (ratio of LABSA:n-butanol was 50:50; ratio of GLDA: kerosene was 60:40) was tested against a mixed scale deposit having 60.45% Calcite and 30% organic content at three different temperatures of 40, 50 and 90° C. 1.5 g of mixed scale deposit was placed in five test tubes and 10 ml of microemulsion formulation was added. The tubes were maintained at a constant temperature in a water bath and mixed occasionally with a gentle stir. At the designated time intervals of 1, 2, 4, 8 and 24 hours, the tubes were removed one by one. The contents of the tubes were filtered immediately under vacuum. The residue was washed with small amount of distilled water three times. The filtrate was dried and ignited at 550° C., followed by dissolution with 1 M of hydrochloric acid and filtered. The subsequent filtrate was made up to 100 ml in a volumetric flask and subjected to analysis of calcium. The same procedure was also conducted at temperatures of 50 and 90° C. The concentration of dissolved calcium carbonate at the various time intervals and temperatures is shown in FIG. 2 and Table 3.

TABLE 3

| Time (hours) | Temperature (° C.) | | |
| --- | --- | --- | --- |
| | 40 | 50 | 90 |
| | As Calcium Carbonate (ppm) | | |
| 1 | 5840 | 7560 | 16640 |
| 2 | 11860 | 14560 | 19330 |
| 4 | 14370 | 16320 | 20610 |
| 8 | 15240 | 17650 | 21840 |
| 24 | 18770 | 20760 | 22230 |

It was demonstrated that most of the mixed scale was dissolved in 4 hours but a slow dissolution continued over a 24 hour period. A fast initial dissolution was attributed to acid attack followed by a slow chelation reaction. It was also observed that the reaction progressed faster at higher temperatures.

The slow acting ability of GLDA is advantageous in tight carbonate stimulation as discussed in Example-3 because it enables wormholing at low injection rates.

More advantageously, GLDA remains soluble in acidic pH at as low as pH 1.7. This may lead to improved hydrolysis of the metal naphthenates, dissolution of mixed scales and stimulation of carbonate reservoirs. Further advantageously, GLDA may be environmentally friendly chemical that can be used in cleaning, scale removal in the pipelines as well as stimulation of oil well.

Example 4—Metal Naphthenate Dissolution Test

A microemulsion of GLDA-Kerosene-LABSA-n-Butanol (ratio of LABSA:n-butanol was 60:40; ratio of GLDA:kerosene was 60:40).

A microemulsion of GLDA-Solvesso-150-LABSA-n-Butanol (ratio of LABSA:n-butanol was 60:40; ratio of GLDA:Solvesso-150 was 60:40) was tested against a metal naphthenate deposit. The metal naphthenate deposit had 60% of organic content determined by an ignition test. The ash was analysed for cations. The weight percent compositions of various di/tri-valent cations present in the ash are shown in Table 4.

10 mL of microemulsion formulation was added to 1.5 g of metal naphthenate deposit in four tubes. The tubes were kept in a water bath at 25° C. Gentle mixing was occasionally done. The tubes were removed from the water bath at 1, 3, 5 and 24 hours intervals. The contents of the tubes were immediately filtered under vacuum and washed with a small amount of distilled water three times. The filtrate was transferred to a porcelain dish and evaporated on a water bath. Once dried, the contents were heated at 550° C. in a muffle furnace. After cooling, the contents were digested in dilute hydrochloric acid, filtered and transferred to 100 ml volumetric flasks. The volume in the volumetric flasks were made up with distilled water. The solutions were analysed for iron content by Inductively Coupled Plasma Optical Emission Spectrometry (ICP). A similar exercise was conducted at 50° C.

TABLE 4

| Metal cation | Concentration (wt %) |
| --- | --- |
| Barium | 0.42 |
| Calcium | 7.12 |
| Chromium | 12.61 |
| Manganese | 0.86 |
| Strontium | 0.03 |
| Zinc | 0.24 |
| Iron | 78.69 |

As shown in Table 4, iron (78.69%) was the dominant cation followed by chromium (12.61%). This suggests that the metal naphthenate deposit is a result of corrosion. This deposit was subjected to a dissolution test with the microemulsion formulation at temperatures of 25° C. and 50° C. FIG. 3 shows the amount of iron dissolved in the microemulsion at time intervals of 1, 3, 5 and 24 hours, which is indicative of reaction propagation. The concentration of dissolved iron at the various time intervals and temperatures is shown in FIG. 3 and Table 5.

TABLE 5

| Time (hours) | Temperature (° C.) | |
| --- | --- | --- |
| | 25 | 50 |
| | Iron content (ppm) | |
| 1 | 12 | 70 |
| 3 | 46 | 147 |
| 5 | 101 | 149 |
| 24 | 844 | 845 |

It was observed that the reaction progressed at a slow rate, and an increase in temperature had a marginal impact on the rate of reaction.

Example 5—Tight Carbonate Core Flood

Stimulation of carbonate reservoirs is generally done by acidization as lime stone (calcium carbonate) is soluble in acid. Acids like hydrochloric and acetic acids are generally employed for this purpose. While reacting with carbonate rock acid may dissolve it at the face, the dissolution reaction will also happen at pore surfaces as well as the acid propagates into porous media, i.e. two phenomena etching (face dissolution) and leaching (dissolution of pore channels) will happen simultaneously. As more channels are formed, more acid is diverted to them. In time, a dominant high permeability channel would emerge where acid flow overruns the moving acid front by many folds. This channel may eventually break through the core forming wormhole. Hence, dissolution is not a preferred method as better results may be achieved by formation of wormholing, which also requires less acid to breakthrough.

Wormholing is the desired mechanism of carbonate acidization. Etching may be governed by reaction rate and leaching by injection rate. Previous core flood studies show that at certain balance of reaction and injection rate, ideal wormholing may be achieved by use of a minimum volume of acidizing formulation. This is called minimum pore volume to breakthrough ($PV_{BTmin}$) and the injection rate to achieve this is called optimal injection rate ($q_{opt}$). Fredd and Fogler 1999 also pointed out that $PV_{BTmin}$ always corresponds to a constant Damkohler Number of 0.29. Damkohler Number is a dimensionless quantity signifying ratio of reaction rate and transport phenomenon. In short, if the reaction rate is high the chemical should be injected at high rate to achieve optimum wormholing. In case of tight reservoirs and long horizontal wells where large area of rock is exposed for acidization, it is impossible to achieve desirable injection rates for highly reactive chemicals such as 15% HCl and 13% acetic acid.

There are two different expressions for Damkohler Number, one for mass transport limited (Equation-1) and the other one for reaction rate limited (Equation-2). A major problem in determination of this quantity is that it requires diameter of the wormhole. Hence, many core flood tests ought to be conducted before establishing the value of $PV_{BTmin}$ and $q_{opt}$. This problem may be overcome if we assume that at high temperatures which are encountered in the oil wells, wormholing becomes a mass transfer limited phenomenon, then only equation-1 is applicable. This equation does not have term d which is diameter of wormhole. In this equation, when Damkohler Number $N_{Da(mt)}$ is replaced by a value of 0.29, the flow rate q will become $q_{opt}$. Then equation-1 will take the form of Equation-3.

$$N_{Da(mt)} = \frac{\pi dLK_1}{q} = 6.33\left(\frac{LD_e}{q}\right)^{2/3} \quad (1)$$

$$N_{Da(rxn)} = \frac{\pi vdLk_r}{q} \quad (2)$$

$$N_{Da(mt)} = 6.33\left(\frac{LD_e}{q_{opt}}\right)^{2/3} = 0.29 \quad (3)$$

Equation-3 can be rewritten for $q_{opt}$ as $$q_{opt} = 102LD_e \quad (4)$$

Thus $q_{opt}$ can be calculated by knowing only diffusion coefficient $D_e$. Secondly, reactivity of the formulation is directly related $q_{opt}$ thus we require formulations with low reaction rate to stimulate formations where injection of stimulant is not possible at high rates.

Carbonate cores from a high temperature, high pressure gas field were subjected to core flood with one embodiment of the formulation. Table 6 describes the test conditions.

TABLE 6

| Condition | Original | Scaled Down (for use in test) |
|---|---|---|
| Temperature | 136° C. (277° F.) | 136° C. (277° F.) |
| Reservoir (Pore) Pressure (av.) | 4986 psi (344 bar) | 1450 psi (100 bar) |
| Overburden (Confining) Pressure | 6709 psi (463 bar) | 3172 psi (219 bar) |
| Net Compressive Stress | 1722 psi (119 bar) | 1722 psi (119 bar) |

The core flooding tests were conducted at three injection rates of 5.0, 3.0 and 1.5 ml/min. The respective pore volumes to achieve breakthrough ($PV_{BT}$) values were found to be 7.8, 4.7 and 6.5. The experimental data was plotted in a graph as shown in FIG. 4 and Table 7, and the minimum pore volume to breakthrough ($PV_{BTmin}$) of 3.0 ml/min was established. This formulation was GLDA-Solvesso-150-LABSA-EGMBE (ratio of LABSA:EGMBE was 55:45; ratio of GLDA:Solvesso-150 was 60:40).

TABLE 7

| $PV_{BT}$ (PV) | Injection rate (ml/min) |
|---|---|
| 6.5 | 1.5 |
| 4.7 | 3 |
| 7.8 | 5 |

FIG. 5 shows a CT scan of a carbonate core after the core flood test where clear wormholing was observed. The geometry of the wormhole after the core flood (at 1.5 ml/min) can be seen in FIG. 5.

The results show that the creation of wormholes in subterranean carbonate formations can be surprisingly achieved at a low injection rate of 1.5 ml/min. The results also show that the reactivity of the carbonates gets reduced to such an extent that wormholing becomes independent of injection rate.

As shown in the results above, the microemulsion can be applied to stimulate carbonate reservoirs with low permeability and high temperature. It was able to create wormhole at very low injection rate of 3.0 ml/min which is indicative of its potential use in high temperature horizontal wells in tight carbonate reservoirs.

The microemulsions of the present disclosure may advantageously be used to stimulate carbonate reservoirs even if the permeability is low and the temperature is high. The microemulsions of the present disclosure may be able to create wormholes at very low injection rates of 1.5 ml/min which is indicative of its potential use in high temperature horizontal wells in tight carbonate reservoirs.

INDUSTRIAL APPLICABILITY

The microemulsions of the present disclosure may be used in wellbore treatment formulations to prevent scaling in pipelines or to remove scales in downhole wellbores. Furthermore, the microemulsions act well against wetted scales, and hence the formulation may be used to increase production from the wellbores producing from sand stone reservoirs and having formation damage.

The microemulsions of the present disclosure may also be used to enhance recovery of crude oil in oilfield operations with tight carbonate rock formations.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A microemulsion comprising:
   a solution comprising glutamic acid N,N-di acetic acid (GLDA) or salts thereof, kerosene, linear alkyl benzene sulfonic acid (LABSA), and n-butanol, wherein the ratio of LABSA to n-butanol is 50:50; and wherein the ratio of the solution comprising GLDA, or salts thereof, to kerosene is 60:40.

2. The microemulsion of claim 1, wherein the solution has a pH value of about 1.7 to about 4.

3. The microemulsion of claim 1, wherein glutamic acid N,N-di acetic acid (GLDA) or salts thereof and kerosene are present in an amount in which the solubilization point of the microemulsion is achieved.

4. The microemulsion of claim 1, wherein the microemulsion has a droplet size of less than 140 nm.

5. A method for preventing or removing formation of organic deposits, inorganic deposits, metal naphthenates, naphthenic acids and/or mixtures thereof from subterranean formations comprising the steps of:
   (i) providing the microemulsion of claim 1, and
   (ii) introducing the microemulsion into a subterranean formation.

6. The method of claim 5, further comprising the step of contacting the microemulsion with the organic deposits, inorganic deposits, metal naphthenates, naphthenic acids, and/or mixtures formed on a surface of a downhole pipeline.

7. A method for stimulating a carbonate reservoir in a subterranean formation, comprising injecting the microemulsion of claim 1 into the subterranean formation.

* * * * *